United States Patent
Ragot et al.

(10) Patent No.: US 10,866,261 B2
(45) Date of Patent: Dec. 15, 2020

(54) MEMS PENDULUM ACCELEROMETER HAVING TWO MEASUREMENT RANGES

(71) Applicant: SAFRAN ELECTRONICS & DEFENSE, Boulogne Billancourt (FR)

(72) Inventors: Vincent Ragot, Boulogne Billancourt (FR); Damien Carre, Boulogne Billancourt (FR); Philippe Ullah, Boulogne Billancourt (FR); Alain Bouteilloux, Boulogne Billancourt (FR); Nicolas Bigourie, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 271 days.

(21) Appl. No.: 15/775,116

(22) PCT Filed: Nov. 16, 2016

(86) PCT No.: PCT/EP2016/077898
§ 371 (c)(1),
(2) Date: May 10, 2018

(87) PCT Pub. No.: WO2017/085142
PCT Pub. Date: May 26, 2017

(65) Prior Publication Data
US 2018/0335445 A1 Nov. 22, 2018

(30) Foreign Application Priority Data

Nov. 16, 2015 (FR) ...................................... 15 02386

(51) Int. Cl.
*G01P 15/13* (2006.01)
*G01P 15/125* (2006.01)
*G01P 15/08* (2006.01)

(52) U.S. Cl.
CPC .......... *G01P 15/131* (2013.01); *G01P 15/125* (2013.01); *G01P 2015/0828* (2013.01)

(58) Field of Classification Search
CPC ................ G01P 15/131; G01P 15/125; G01P 2015/0828
USPC ......... 73/1.38, 1.39, 514.18, 514.21, 514.23, 73/514.24; 702/96, 141; 361/280
See application file for complete search history.

(56) References Cited

U.S. PATENT DOCUMENTS 5,473,946 A 12/1995 Wyse et al.

FOREIGN PATENT DOCUMENTS

| EP | 1 962 063 A1 | 8/2008 |
| EP | 2 770 332 A1 | 8/2014 |

*Primary Examiner* — Robert R Raevis

(74) *Attorney, Agent, or Firm* — Muncy, Geissler, Olds & Lowe, P.C.

(57) ABSTRACT

An accelerometer sensor having electrodes forming capacitors of capacitance that vary as a function of distances between the electrodes, a control unit being arranged to perform an operation of measuring the capacitances and a control operation that comprises selectively: a fine control stage in which a first voltage is applied between one of the stationary electrodes and the movable electrode, while the other stationary electrode is at the same potential as the movable electrode; and an extended control stage in which a second voltage is applied between one of the stationary electrodes and the movable electrode, the other stationary electrode being at the same potential as the movable electrode, and the second voltage being greater in absolute value than the first voltage.
A method using such a sensor.

9 Claims, 2 Drawing Sheets

MEMS PENDULUM ACCELEROMETER HAVING TWO MEASUREMENT RANGES

FIELD OF THE INVENTION

The present invention relates to detecting a physical magnitude by means of an inertial sensor, and more particularly by means of a pendulum accelerometer sensor, e.g. a sensor of the microelectromechanical system (MEMS) type.

STATE OF THE ART

An electrostatic pendulum accelerometer comprises a housing that is connected to an inertial mass via one or more hinges that are positioned in such a manner that the inertial mass forms a pendulum that is movable relative to the housing, either in translation or else in rotation. Movements of the inertial mass under the effect of acceleration are generally detected by means of three electrodes. A first stationary electrode and a second stationary electrode are secured to the housing and they are connected to an excitation circuit. The third electrode is movable, it is carried by the pendulum, and it is connected to a detector circuit.

Each stationary electrode co-operates with the movable electrode to form a capacitor of capacitance that depends on the spacing between them. In the absence of any manufacturing defect and in the event that the sensor is not being subjected to an acceleration along its sensing axis, the pendulum remains in a neutral position in which the two capacitances are equal. In contrast, when the pendulum is subjected to acceleration along its sensing axis, it moves, thereby reducing the capacitance formed between the movable electrode and one of the stationary electrodes, while increasing the capacitance formed between the movable electrode and the other stationary electrode. This variation in the capacitances also depends on deformation of the housing and of the pendulum.

In closed-loop operation, the position of the pendulum is servo-controlled to its neutral position, or setpoint position, halfway between the stationary electrodes, by applying an electrostatic force to the pendulum. The electrostatic force must therefore be capable of compensating the acceleration applied along the sensing axis, thereby making it possible to estimate that acceleration. The electrostatic force is the result of voltages applied to the electrodes in order to maintain the difference between the capacitances at zero.

OBJECT OF THE INVENTION

The ratio between the drift performance of a sensor and the extent of its measurement range is determined by the accuracy with which the mechanical structure and the electronic circuit of the sensor are made.

In order to make a sensor that possesses little drift with a large measurement range, it is at present necessary to make use of mechanical and electronic structures that are accurate, and therefore expensive. The invention seeks to overcome that limit.

SUMMARY OF THE INVENTION

To this end, there is provided an accelerometer sensor comprising a structure having fastened thereto a pendulum-forming inertial body carrying a movable electrode that is connected to a control unit that is also connected to two stationary electrodes secured to the structure in order to co-operate with the movable electrode to form two capacitors of capacitances that are variable as a function of distances between the electrodes. The control unit is arranged to perform operations of measuring the capacitances and a control operation as a function of the measured capacitances, in which a voltage is applied to the electrodes in order to maintain the pendulum in a predetermined position. These operations are performed by applying pulses. According to the invention, the control operation comprises: selectively:

a fine control stage in which a first voltage is applied between one of the stationary electrodes and the movable electrode, while the other stationary electrode is at the same potential as the movable electrode; or an extended control stage in which a second voltage is applied between one of the stationary electrodes and the movable electrode, the other stationary electrode being at the same potential as the movable electrode, and the second voltage being greater in absolute value than the first voltage.

Thus:

optimal bias performance is obtained by sending commands of moderate amplitude. This corresponds to the "fine" mode of operation;

in the "extended" mode of operation, large amplitude commands may be sent, thus enabling the dynamic range to be extended to the detriment of bias performance.

In general, the full scale of the sensor is rarely needed, other than that when the carrier of the sensor is being subjected to strong acceleration or deceleration, e.g. during a sudden movement of the carrier, as a result of an impact or as a result of the carrier stopping suddenly. In contrast, the full scale is usually not used during other stages of movement of the carrier.

The invention thus makes it possible:

during the fine control stage, to guarantee optimum performance over a small measurement range; and during the extended control stage, to take measurements over an extended range with performance that is potentially degraded.

Thus, with the invention, the performance of the sensor remains optimized on average over the duration of operation since the extended control range is normally used rarely in nominal utilization (i.e. excluding special operations such as calibration or testing).

In a particular embodiment, during the fine control stage, a reference potential is applied to said one of the stationary electrodes, and a second potential is applied to said movable electrode and to said other stationary electrode, and in the extended control stage, the reference potential is applied to said one of the stationary electrodes and the reference potential is applied with opposite polarity both to said movable electrode and also to said other one of the stationary electrodes.

This embodiment makes it possible to limit the number of voltages used, thereby making the sensor easier to design and fabricate.

It is then preferable for the second potential to be zero.

The invention also provides a method of detecting acceleration by means of such a sensor.

Other characteristics and advantages of the invention appear on reading the following description of particular, non-limiting embodiments of the invention.

BRIEF DESCRIPTION OF THE FIGURES

Reference is made to the accompanying drawings, in which.

DETAILED DESCRIPTION OF THE INVENTION

Figure 1:
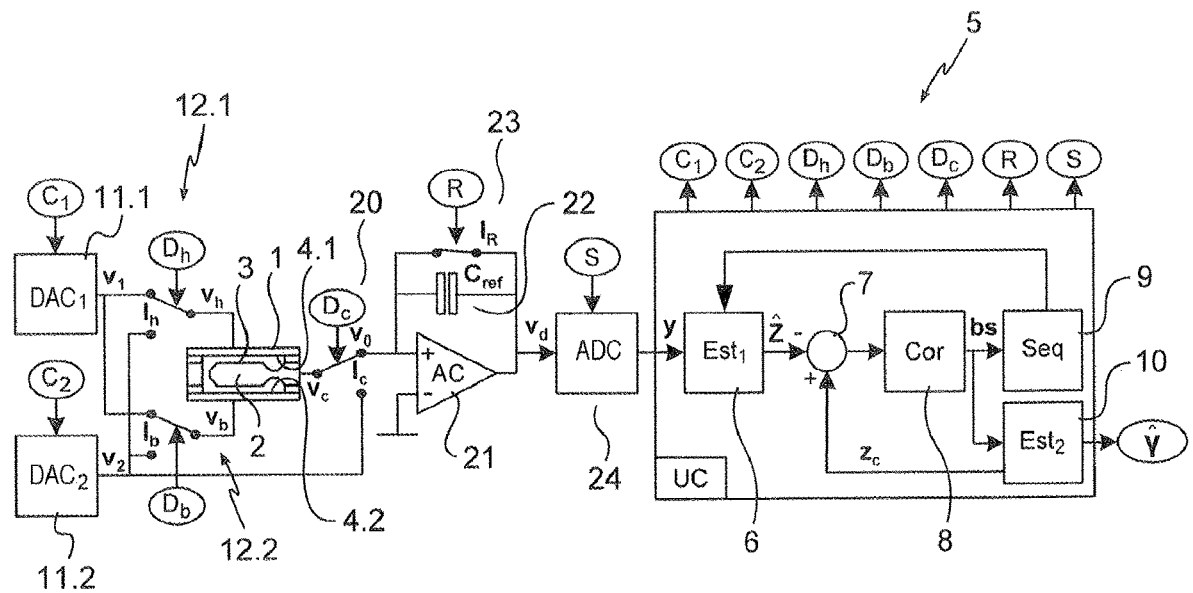
FIG. 1 is a diagrammatic view of a sensor of the invention.
Figure 2:
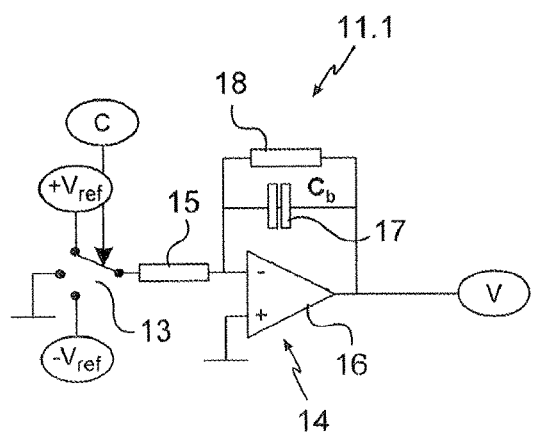
FIG. 2 is a diagrammatic view of a digital-to-analog converter used in the sensor of the invention.

With reference to the figure, the accelerometer sensor of the invention in this example is a microelectromechanical system (MEMS) made by etching a wafer of crystalline or semi-crystalline material, specifically of silicon.

The sensor comprises a structure 1 having a pendulum-forming inertial body 2 hinged thereto that carries an electrode 3 that is movable relative to the structure 1.

Two stationary electrodes 4.1 and 4.2 are secured to the structure 1 in order to co-operate with the movable electrode 3 to form two capacitors of capacitances that vary as a function of distances between the electrodes 4.1 and 3 and also between the electrodes 4.2 and 3.

The electrodes 3, 4.1, and 4.2 are connected to an electronic control unit given overall reference 5. The control unit 5 has an electronic control circuit of known structure comprising a first estimator 6 connected to the negative input of a subtracter 7 having an output connected to the input of a corrector 8. The corrector 8 has a first output connected to a sequencer 9 and a second output connected to a second estimator 10 having a first output forming the main output of the control unit 5, and a second output connected to the positive input of the subtracter 7.

The control unit 5 is connected to digital-to-analog converters, given overall references 11.1, 11.2 that are respectively connected to the stationary electrodes 4.1, 4.2 via switches 12.1, 12.2.

Each digital-to-analog converter 11.1, 11.2 has a switch 13 that is controlled by the control unit 5 and that possesses a first input terminal at a reference potential $+V_{ref}$; a second input terminal at a potential that is the inverse of the reference potential, i.e. $-V_{ref}$; a third input terminal connected to a zero potential; and an output terminal connected to an impedance matching circuit 14. The impedance matching circuit 14 is itself known and comprises an input resistor 15 connected to the negative input of an operational amplifier 16, which is looped by a feedback capacitor 17 and a resistor 18. The capacitance of the feedback capacitor 17 determines the rise and fall times, thereby making it possible to control the charging and discharging currents that are applied to the capacitors respectively between the electrodes 4.1 and 3 and between the electrodes 4.2 and 3.

The digital-to-analog converter 11.1 has its output $V_1$ connected to a first terminal of the switch 12.1 and to a first terminal of the switch 12.2. The digital-to-analog converter 11.2 has its output $V_2$ connected to the second terminal of the switch 12.1 and to a second terminal of the switch 12.2. The switch 12.1 has a third terminal $V_h$ connected to the first stationary electrode 4.1, and the switch 12.2 has a third terminal $V_b$ connected to the second stationary electrode 4.2. The switches 12.1 and 12.2 are controlled so as to connect their third terminals either to their first terminals or to their second terminals.

The movable electrode 3 has its output $V_c$ connected to a first terminal of a switch 20 having a second terminal connected to the output $V_2$ of the digital-to-analog converter 11.2 and a third terminal $V_0$ connected to the inverting input of a load amplifier 21 with a feedback capacitor 22 and a feedback switch 23. The load amplifier 21 has its output $V_d$ connected to an analog-to-digital converter 24 connected to the input of the first estimator 6.

The sequencer 9 issues the following commands:

$C_1$ for controlling the switch 13 of the digital-to-analog converter 11.1;

$C_2$ for controlling the switch 13 of the digital-to-analog converter 11.2;

$D_h$ for controlling the switch 12.1;

$D_b$ for controlling the switch 12.2;

$D_c$ for controlling the switch 20;

R for controlling the switch 23; and

S for controlling the analog-to-digital converter 24.

The control unit is arranged to issue logic signals $ED_1$, $ED_2$ causing the capacitances between the electrodes 3 and 4.1 and also between the electrodes 3 and 4.2 to be measured, and a logic signal EC causing pulses to be delivered as a function of the measured capacitances so as to maintain the pendulum in a predetermined position, namely a middle position between the stationary electrodes 4.1 and 4.2.

The control operation comprises selectively a fine control stage and an extended control stage. In the fine control stage, a first voltage is applied between one of the stationary electrodes 4.1, 4.2 and the movable electrode 3, while the other stationary electrode 4.1, 4.2 is at the same potential as the movable electrode 3. During the extended control stage, a second voltage is applied between one of the stationary electrodes 4.1, 4.2 and the movable electrode 3, while the other stationary electrode 4.1, 4.2 is at the same potential as the movable electrode 3. The second voltage is of greater absolute value than the first voltage.

More precisely, in the fine control stage, a reference potential $V_{ref}$ is applied to said one of the stationary electrodes 4.1, 4.2, and a second potential, zero, in this example, is applied to said movable electrode 3 and to said other stationary electrode 4.1, 4.2.

More precisely, in the extended control stage, the reference potential $V_{ref}$ is applied to said one of the stationary electrodes 4.1, 4.2, and the reference potential is applied with opposite polarity to said movable electrode 3 and to said other stationary electrode 4.1, 4.2.

The logic commands $D_c$, $D_h$, $D_b$, and EC satisfy the following Boolean relationships:

$$D_c = \overline{EC}$$
$$D_h = ED_1 + EC \cdot \frac{1+bs}{2}$$
$$D_b = ED_2 + EC \cdot \frac{1-bs}{2}$$
$$bs = \pm 1$$

Figure 3:
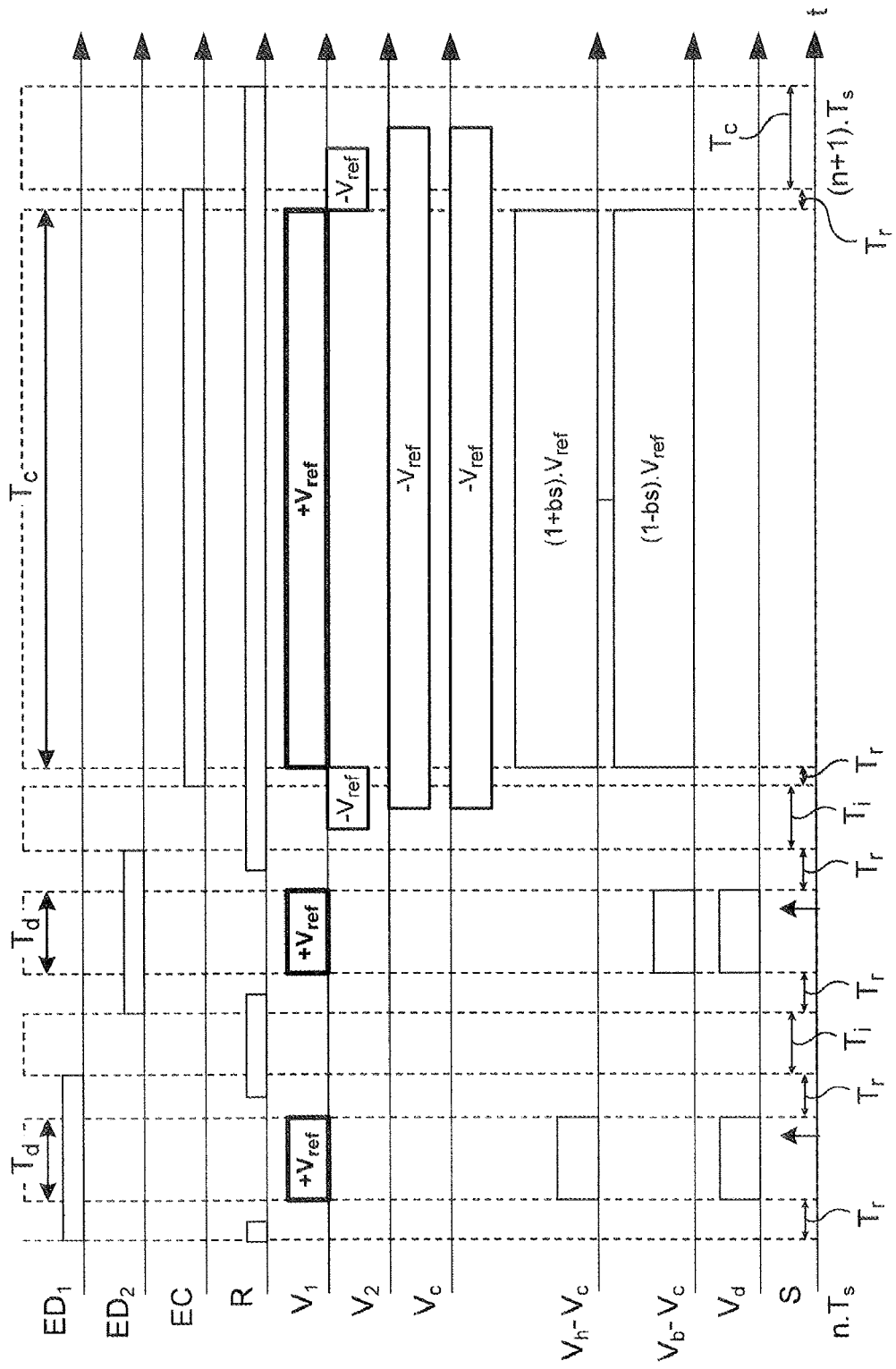
FIG. 3 is a timing diagram showing the operation of the sensor in its extended range.

The timing diagram of FIG. 3 shows the various operations that are performed in the extended range during the sampling period $T_s$ that comprises two detection periods $T_d$ (corresponding to the signals $ED_1$ and $ED_2$) and one control period $T_c$ (corresponding to the signal EC).

It can be seen that in the extended range, the outputs $V_1$, $V_2$, and $V_c$ may take the potentials $+V_{ref}$ or $-V_{ref}$ depending on the direction of the force that is to be exerted on the pendulum. The voltage applied to the capacitor $C_h$ (between the electrodes 4.1 and 3) is $(1+bs)V_{ref}$, and the voltage applied to the capacitor $C_b$ (between the electrodes 4.2 and 3) is $(1-bs)V_{ref}$, where bs depends on the direction of the force to be exerted on the pendulum.

In contrast, in the fine range, the outputs $V_1$, $V_2$, and $V_c$ may take the potentials $+V_{ref}$ or 0 depending on the direction of the force to be exerted on the pendulum. Under such circumstances, the voltage applied to the capacitor $C_h$ (between the electrodes 4.1 and 3) is $(1+bs)V_{ref}/2$, and the voltage applied to the capacitor $C_b$ (between the electrodes 4.2 and 3) is $(1-bs)V_{ref}/2$, where bs depends on the direction of the force to be exerted on the pendulum. The effectiveness of the control pulse in the fine range is thus divided by four.

During a detection operation, where $Q_0$ is the charge injected by the switch 23 on being opened and $v_{os}$ is the offset voltage at the output from the load amplifier 21, the output voltages from the load amplifier 21 at the two sampling instances are given by:

$$v_{dh} = -\frac{C_h \cdot V_{ref} + Q_o}{C_{ref}} + v_{os}$$

$$v_{db} = -\frac{C_b \cdot V_{ref} + Q_o}{C_{ref}} + v_{os}$$

The difference between the capacitances can be deduced therefrom as follows:

$$C_h - C_b = C_{ref} \cdot \frac{v_{db} - v_{dh}}{V_{ref}}$$

To the first order, the position z is an affine function of the above difference.

The control unit 5 manages the operation of the device, in particular the timing of the various sampling operations at a frequency $F_s$ (period $T_s=1/F_s$, see FIG. 3). The control unit 5 controls the digital-to-analog converters 11.1, 11.2 and the analog-to-digital converter 24, and the analog switches 12.1, 12.2, and 20 in sequential and cyclic manner.

Depending on the logic state of the command $D_c$, the movable electrode 3 is connected to the inverting input of the load amplifier 21 or to the output $v_2$ of the digital-to-analog converter 11.2.

Depending on the logic state of the command $D_h$, the stationary electrode 4.1 is connected to the output $v_1$ of the digital-to-analog converter 11.1 or to the output $v_2$ of the digital-to-analog converter 11.2.

Depending on the logic state of the command $D_b$, the stationary electrode 4.2 is connected to the output $v_1$ of the digital-to-analog converter 11.1 or to the output $v_2$ of the digital-to-analog converter 11.2.

The voltages $v_h$, $v_c$, and $v_b$ applied to the electrodes 4.1, 3, and 4.2 are sequenced so as to measure $C_h$, to measure $C_b$, and then to apply electrostatic force enabling the pendulum to be servo-controlled to its setpoint position imposed by the control unit 5.

In a detection stage, the movable electrode 3 is connected to the inverting input of the load amplifier 21 with feedback by capacitance $C_{ref}$ from the capacitor 22 and by the switch 23 as controlled by the logic signal R from the sequencer 9. By negative feedback, this load amplifier 21 permanently maintains the potential $v_0$ in the vicinity of zero.

The output voltage $v_d$ of the load amplifier 21 is converted into a digital magnitude γ by the analog-to-digital converter 24 under the control of the logic signal S.

The estimator 6 provides the estimate $\hat{z}$ of the movement of the pendulum from the magnitude γ.

The estimator 10 provides the setpoint $z_c$ that makes it possible to compensate the offset due to the static asymmetries of the capacitances between the electrodes 4.1 and 3 and between the electrodes 3 and 4.2.

The difference $z_c - \hat{z}$ is servo-controlled to zero by a digital corrector 8 that prepares a command bs of value +1 or −1 depending on whether it is appropriate to push or to pull the pendulum in order to bring the input of the corrector 8 back to zero.

If bs=+1, the voltage is applied to the electrode 4.1, which pulls the pendulum towards it.

If bs=−1, the voltage is applied to the electrode 4.2 which then pulls the pendulum towards it.

The estimator 10 prepares the estimate $\hat{\gamma}$ of the acceleration that needs to be measured, and it also prepares the setpoint $z_c$.

The sequencer 9 sequences the operations within the sampling period and from one sampling period to another.

Finally, the control unit 5 selects the operating range in autonomous manner, either the extended range or the fine range, as a function of the value $\hat{\gamma}$, which is compared with a threshold.

The differences in the response times of the analog switches 12.1, 12.2, and 20 are the main source of asymmetry in the pulses. To remedy this, the detection operations (measuring the capacitances $C_h$ and $C_b$, referenced $T_d$ in FIG. 3) and the control operations (referenced $T_c$ in FIG. 3) are separated by so-called "relaxation" stages (referenced $T_r$ in FIG. 3) during which each of the switches 12.1, 12.2, and 20 is prepositioned, while the three voltages applied to their terminals are identical. However, during certain stages, it is essential for the voltages applied to the three electrodes to be caused to vary simultaneously. For this purpose, they are previously connected to the digital-to-analog converter 11.2 before causing its output to vary. These stages are referenced $T_1$ in the timing diagram of FIG. 3.

Naturally, the invention is not limited to the embodiments described and covers any variant coming within the ambit of the invention as defined by the claims.

In particular, the timing of the above operations may be different from that described. For example, the number of switch operations performed in the fine range may be reduced, or the durations, the amplitudes, and the signs of the pulses may be modified. In addition, the detection stages may be permutated from one period to another in order to improve operating symmetry.

The voltage in the extended range may optionally be an integer multiple of the voltage in the fine range.

The low potential in the fine range may be other than zero.

The threshold with which the estimate of the acceleration is compared may be set permanently in the factory or it may be modified as a function of the conditions of utilization of the sensor or of the performance desired for the sensor.

The invention claimed is:

1. An accelerometer sensor comprising:
    a structure;
    an inertial body fastened to the structure and carrying a movable electrode;
    the movable electrode being connected to a controller that is also connected to two stationary electrodes secured to the structure in order to co-operate with the movable electrode to form two capacitors of capacitances that are variable as a function of distances between the electrodes,
    the controller being arranged to measure the capacitances and to control the inertial body to maintain a predetermined position as a function of the measured capacitances, in which voltages are applied to the electrodes, the measuring and controlling being performed by applying pulses, wherein the sensor selectively comprises:
- a "fine" control stage in which a first voltage is applied between one of the stationary electrodes and the movable electrode, while the other stationary electrode is at the same potential as the movable electrode; or
- an "extended" control stage in which a second voltage is applied between one of the stationary electrodes and the movable electrode, the other stationary electrode being at the same potential as the movable electrode, and the second voltage being greater in absolute value than the first voltage; and wherein the control stage is selected as a function of an estimate of the acceleration as obtained from the measured capacitances.

2. A sensor according to claim 1, wherein, during the fine control stage, a reference potential is applied to said one of the stationary electrodes, and a second potential is applied to said movable electrode and to said other stationary electrode, and in the extended control stage, the reference potential is applied to said one of the stationary electrodes and the reference potential is applied with opposite polarity both to said movable electrode and also to said other one of the stationary electrodes.

3. A sensor according to claim 2, wherein the second potential is zero.

4. A sensor according to claim 1, wherein the controller comprises two digital-to-analog converters that are connected to respective ones of the stationary electrodes.

5. A sensor according to claim 4, wherein each digital-to-analog converter comprises a switch that is controlled by the controller and that possesses a first input terminal at a reference potential, a second input terminal at a potential that is the inverse of the reference potential, a third input terminal at a zero potential, and an output terminal.

6. A sensor according to claim 5, wherein the output terminal is connected to an impedance matching circuit.

7. A sensor according to claim 1, wherein the movable electrode is connected to an input of an analog-to-digital converter having an output connected to an input of a first estimator connected to the negative input of a subtracter having an output connected to the input of a corrector (having a first output connected to a sequencer and a second output connected to a second estimator having a first output forming the main output of the controller and a second output connected to the positive input of the subtracter; the first estimator being arranged to provide a first estimate of a movement of the inertial body from a potential difference between the capacitances, the second estimator being arranged to provide a second estimate of this movement and a control setpoint for compensating an offset due to static symmetry of the capacitances, the corrector being arranged to servo-control the difference between the setpoint and the first estimate on zero, the sequencer being arranged to control the sensor.

8. A sensor according to claim 7, wherein the movable electrode is connected to a first terminal of a switch having a second terminal connected to the output of a digital-to-analog converter connected to one of the stationary electrodes and to a third terminal connected to the inverting input of a load amplifier with feedback via a capacitor and a switch, the load amplifier having its output connected to the analog-to-digital converter connected to the input of the first estimator.

9. A method of detecting acceleration by means of an accelerometer sensor comprising a structure having fastened thereto an inertial body carrying a movable electrode that is connected to a controller that is also connected to two stationary electrodes secured to the structure in order to co-operate with the movable electrode to form two capacitors of capacitances that are variable as a function of distances between the electrodes, the method comprising:
- measuring the capacitances; and
- controlling the inertial body to maintain a predetermined position based on the measured capacitances, in which voltages are applied to the electrodes in order to maintain the inertial body in a predetermined position, the measuring and controlling performed by applying pulses, wherein the controlling comprises selecting:
  - a "fine" control stage in which a first voltage is applied between one of the stationary electrodes and the movable electrode, while the other stationary electrode is at the same potential as the movable electrode; or
  - an "extended" control stage in which a second voltage is applied between one of the stationary electrodes and the movable electrode, the other stationary electrode being at the same potential as the movable electrode, and the second voltage being greater in absolute value than the first voltage.

* * * * *